US008941262B2

(12) United States Patent
Arimoto (10) Patent No.: US 8,941,262 B2
(45) Date of Patent: Jan. 27, 2015

(54) POWER SUPPLY DEVICE AND IMAGE FORMING APPARATUS HAVING THE SAME

(75) Inventor: Hideki Arimoto, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 802 days.

(21) Appl. No.: 13/193,021

(22) Filed: Jul. 28, 2011

(65) Prior Publication Data
US 2012/0026532 A1  Feb. 2, 2012

(30) Foreign Application Priority Data

Jul. 30, 2010  (JP) ................................ 2010-172545

(51) Int. Cl.
  H02J 1/10   (2006.01)
  H02J 9/00   (2006.01)
  G06F 1/32   (2006.01)
(52) U.S. Cl.
  CPC ............... *H02J 9/005* (2013.01); *H02J 1/108* (2013.01); *G06F 1/3284* (2013.01); *G06F 1/3296* (2013.01); *Y02B 60/1267* (2013.01)
  USPC ................... 307/38; 307/11; 307/18; 307/42; 307/139; 307/150; 307/151
(58) Field of Classification Search
  CPC ....................................................... H02J 1/108
  USPC .................. 307/11, 18, 38, 42, 139, 150, 151
  See application file for complete search history.

(56) References Cited

U.S. PATENT DOCUMENTS

| 5,309,082 | A | 5/1994 | Payne |
| 8,013,477 | B2* | 9/2011 | Chueh et al. .................. 307/140 |
| 2012/0043811 | A1* | 2/2012 | Jeong et al. ..................... 307/31 |

FOREIGN PATENT DOCUMENTS

| JP | HEI 6-168043 | 6/1994 |
| JP | HEI11-177731 | 7/1999 |
| JP | 2010-109962 | 5/2010 |

* cited by examiner

*Primary Examiner* — Adi Amrany
(74) *Attorney, Agent, or Firm* — Scully, Scott, Murphy & Presser, PC (57) ABSTRACT

A power supply device having a first load operating with a first voltage in a normal operation mode, a second load operating with a second voltage lower than the first voltage in the normal operation mode, and a third load operating with the second voltage in the normal operation mode and a power-saving mode. An auxiliary second-voltage generating circuit configured to, when a main supply voltage is supplied from a main power supply circuit and a primary second-voltage generating circuit does not generate the second voltage with a third-load electric path for carrying therethrough the main supply voltage from the main power supply circuit to the third load without passing through the primary second-voltage generating circuit being broken by a switching circuit, generate the second voltage from the main supply.

19 Claims, 5 Drawing Sheets

POWER SUPPLY DEVICE AND IMAGE FORMING APPARATUS HAVING THE SAME

CROSS-REFERENCE TO RELATED APPLICATION

This application claims priority under 35 U.S.C. §119 from Japanese Patent Application No. 2010-172545 filed on Jul. 30, 2010. The entire subject matter of the application is incorporated herein by reference.

BACKGROUND

1. Technical Field

The following description relates to one or more techniques, for an image forming apparatus, to generate a supply voltage depending on an operation mode and supplying the generated supply voltage to one or more loads.

2. Related Art

Various techniques have been proposed for reducing electric power consumption of a device configured to operate functional circuits, such as a driving circuit and a control circuit, in response to receipt of power supply from a power supply device. For example, a communication terminal device has been proposed, which is configured to reduce electric power consumption of the device as a whole by switching an operation mode between a normal operation mode and a power-saving mode (a low power consumption mode) depending on a usage state or an operating state of the device. It is noted that the normal operation mode is a mode where each functional circuit can operate in response to an electric power being supplied to the entire device from a main power supply. In addition, the power-saving mode is a mode where the electric power is supplied to one or more specific functional circuits from the main power supply.

However, according to the communication terminal device, since the main power supply performs the same operation (to generate a predetermined supply voltage) regardless of the operation mode, the power consumption of the main power supply hardly varies. Therefore, especially when the device is configured such that a variety of functional circuits thereof need respective operational supply voltages and the power-saving mode requires only the lowest operational supply voltage to be supplied (i.e., functional circuits which operate with higher operational supply voltages are deactivated in the power-saving mode), a problem is caused concerning wasteful power consumption in the main power supply.

A concrete example will be provided under the following assumption. The communication terminal device has a first load that operates with a first voltage and second and third loads that operate with a second voltage lower than the first voltage. The main power supply always generates and outputs the first voltage. To the first load, the first voltage is supplied as is from the main power supply. The second and third loads are supplied with the second voltage into which the first voltage from the main power supply has been converted via a regulator. In the power-saving mode, the third load is only supplied with the second voltage while the first and second loads are deactivated.

In the above example, the first load is not supplied with the first voltage in the power-saving mode. Further, the second load is not supplied with the second voltage from the regulator. Therefore, it is possible to save power consumption of the device as a whole. However, even in the power-saving mode, since the main power supply needs to output the first voltage, it is impossible to save power consumption of the main power supply.

In consideration of the above problem, a technique has been proposed to achieve power saving of the main power supply even in the power-saving mode. Specifically, a power supply circuit (corresponding to the aforementioned main power supply) generates the first voltage in the normal operation mode while the power supply circuit generates the second voltage in the power-saving mode. However, in this case, the regulator is as well supplied with the second voltage, and consequently cannot operate normally. Thus, the proposed technique is provided with an electric path through which an electric power is supplied from the power supply circuit to the third load without involving the regulator and a switch that selectively makes or breaks the electric path. Further, in this configuration, when the switch is turned on in the power-saving mode, the second voltage is supplied from the power supply circuit directly to the third load.

According to the proposed technique, in the power-saving mode, the power supply circuit generates the second voltage lower than the first voltage generated in the normal operation mode. Thus, it is possible to save the power consumption of the power supply circuit in the power-saving mode in comparison with the normal operation mode where the power supply circuit generates the first voltage.

SUMMARY

However, in the proposed technique, there might be a risk that a no-power-supplied period during which the second voltage is not supplied to the third load arises in a process of switching the operation mode. Specifically, in the case where the regulator for stepping down the first voltage to the second voltage is unable to generate the second voltage when an input voltage into the regulator is not equal to or more than a predetermined threshold value higher than the second voltage, the regulator cannot generate the second voltage as long as the input voltage is less than the threshold value. Meanwhile, even after the operation mode is switched to the power-saving mode, the switch, for supplying the supply voltage from the power supply circuit directly to the third load, cannot be turned on to supply the output voltage to the third load, as long as an output voltage from the power supply circuit is not yet reduced to a value around the second voltage and still higher than the maximum voltage (the maximum rated input voltage) permitted to be supplied to the third load.

Therefore, while the output voltage from the power supply circuit is higher than the maximum rated input voltage and lower than the threshold value in the process of switching the operation mode, the no-power-supplied period arises during which the second voltage is not supplied to the third load from the regulator or via the switch. Thereby, it might lead to a risk that the third load stops its operation.

In order to overcome the risk, the proposed technique has suggested a chargeable condenser (capacitor) connected in parallel with the electric path through which the electric power is supplied to the third load. Namely, during the no-power-supplied period, the third load is allowed to operate with electric charge stored in the condenser. However, this solution is considered distant from the standpoint of the cost and space for mounting the condenser, since the condenser is required to have a large electrostatic capacity enough to maintain a stable continuous operation of the third load.

Aspects of the present invention are advantageous to provide one or more improved techniques that make it possible to maintain electric power supply to a load (an always-operating load), which is required to operate in both the normal operation mode and the power-saving mode, and a stable continuous operation of the always-operating load even in the process of switching the operation mode.

According to aspects of the present invention, a power supply device is provided, which is configured to operate in one of a normal operation mode and a power-saving mode. The power supply device includes a first load configured to operate with a first voltage supplied thereto in the normal operation mode, a second load configured to operate with a second voltage supplied thereto in the normal operation mode, the second voltage being lower than the first voltage, a third load configured to operate with the second voltage supplied thereto in both the normal operation mode and the power-saving mode, a main power supply circuit configured to output, as a main supply voltage, at least one of the first voltage and the second voltage in response to an operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode, a first-load electric path configured to carry therethrough the main supply voltage from the main power supply circuit to the first load, a primary second-voltage generating circuit configured to, when the main supply voltage is supplied thereto from the main power supply circuit and the main supply voltage is lower than the first voltage and equal to or higher than a predetermined threshold value higher than the second voltage, be allowed to generate the second voltage from the main supply voltage and supply the generated second voltage to the second load and the third load, a third-load electric path configured to carry therethrough the main supply voltage from the main power supply circuit to the third load without passing through the primary second-voltage generating circuit, a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied, and an auxiliary second-voltage generating circuit configured to, when the main supply voltage is supplied from the main power supply circuit and the primary second-voltage generating circuit is forbidden to generate the second voltage with the third-load electric path being broken by the switching circuit, generate the second voltage from the main supply voltage and supply the generated second voltage to the third load.

According to aspects of the present invention, further provided is a power supply device configured to operate in any of a normal operation mode in which the power supply device supplies a first load with a first voltage to operate the first load, and supplies each of a second load and a third load with a second voltage lower than the first voltage to operate the second load and the third load and a power-saving mode in which the power supply device supplies the third load with the second voltage to operate the third load. The power supply device includes a main power supply circuit configured to output, as a main supply voltage, at least one of the first voltage and the second voltage in response to an operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode, a first-load electric path configured to carry therethrough the main supply voltage from the main power supply circuit to the first load, a primary second-voltage generating circuit configured to, when the main supply voltage is supplied thereto from the main power supply circuit and the main supply voltage is lower than the first voltage and equal to or higher than a predetermined threshold value higher than the second voltage, be allowed to generate the second voltage from the main supply voltage and supply the generated second voltage to the second load and the third load, a third-load electric path configured to carry therethrough the main supply voltage from the main power supply circuit to the third load without passing through the primary second-voltage generating circuit, a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied, and an auxiliary second-voltage generating circuit configured to, when the main supply voltage is supplied from the main power supply circuit and the primary second-voltage generating circuit is forbidden to generate the second voltage with the third-load electric path being broken by the switching circuit, generate the second voltage from the main supply voltage and supply the generated second voltage to the third load.

According to aspects of the present invention, further provided is an image forming apparatus including a power supply device configured to operate in one of a normal operation mode and a power-saving mode. The power supply device includes a first load configured to operate with a first voltage supplied thereto in the normal operation mode, the first load including a driving unit configured to drive an image forming unit for perform image formation on a recording medium, a second load configured to operate with a second voltage supplied thereto in the normal operation mode, the second voltage being lower than the first voltage, the second load including a controller configured to control the driving unit, a third load configured to operate with the second voltage supplied thereto in both the normal operation mode and the power-saving mode, the third load including a switching signal output unit configured to output, as an operation mode switching signal, a signal indicating the power-saving mode when a predetermined power-saving mode transition condition is satisfied and to output, as the operation mode switching signal, a signal indicating the normal operation mode when a predetermined normal operation mode transition condition is satisfied, a main power supply circuit configured to output, as a main supply voltage, at least one of the first voltage and the second voltage in response to the operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode, a first-load electric path configured to carry therethrough the main supply voltage from the main power supply circuit to the first load, a primary second-voltage generating circuit configured to, when the main supply voltage is supplied thereto from the main power supply circuit and the main supply voltage is lower than the first voltage and equal to or higher than a predetermined threshold value higher than the second voltage, be allowed to generate the second voltage from the main supply voltage and supply the generated second voltage to the second load and the third load, a third-load electric path configured to carry therethrough the main supply voltage from the main power supply circuit to the third load without passing through the primary second-voltage generating circuit, a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied, and an auxiliary second-voltage generating circuit configured to, when the main supply voltage is supplied from the main power supply circuit and the primary second-voltage generating circuit is forbidden to generate the second voltage with the third-load electric path being broken by the switching circuit, generate the second voltage from the main supply voltage and supply the generated second voltage to the third load.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
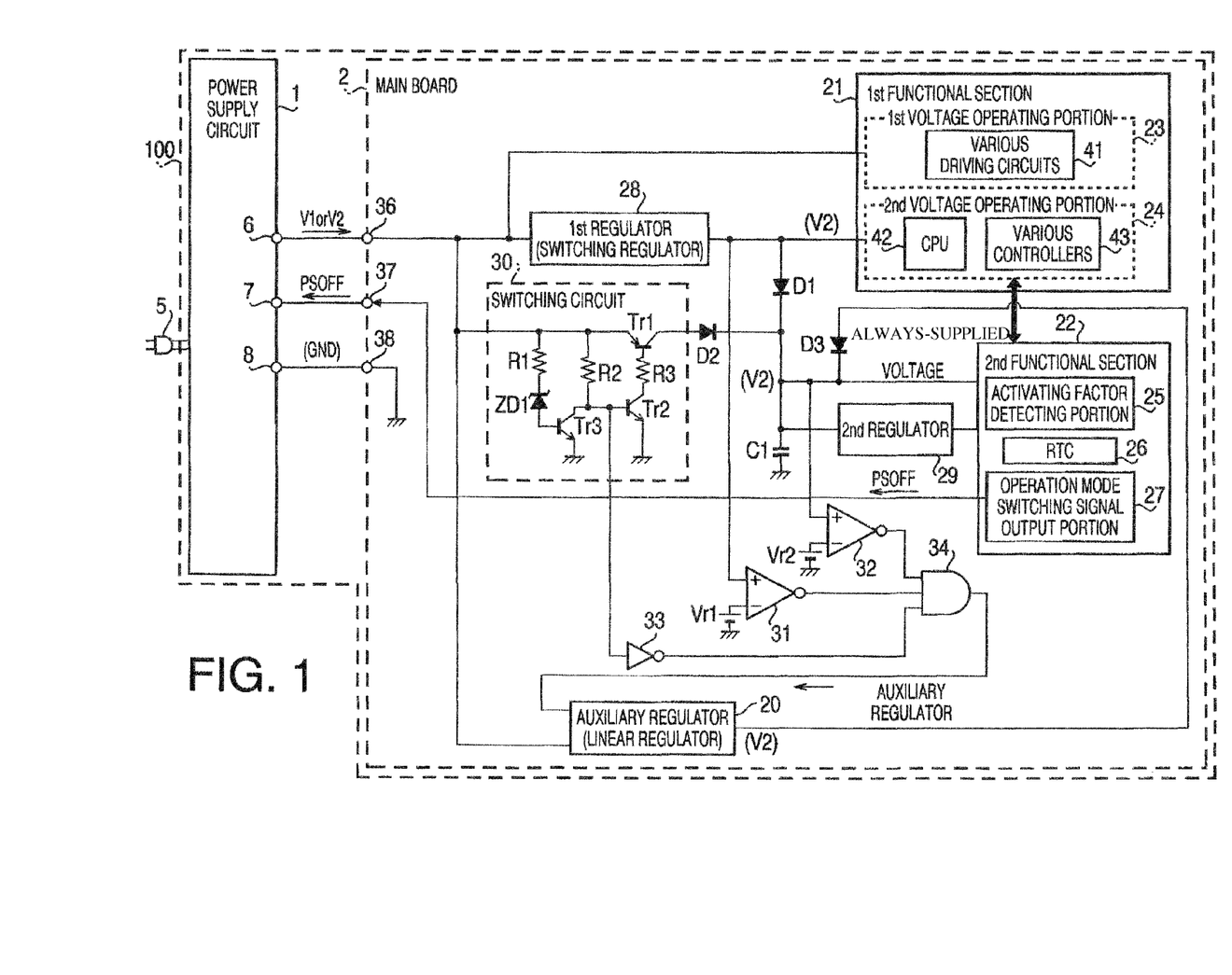
FIG. 1 is an electric diagram showing an electric configuration of an image forming apparatus in an embodiment according to one or more aspects of the present invention.

Hereinafter, an embodiment according to aspects of the present invention will be described with reference to the accompanying drawings. As shown in FIG. 1, an image forming apparatus 100 of the embodiment includes a power supply circuit 1 and a main board 2. On the main board 2, there are various functional circuits mounted, which are configured to operate with an electric power (a main power supply voltage) supplied from the power supply circuit 1.

The image forming apparatus 100 includes a feed motor (not shown) for feeding along a feeding path a sheet on which an image is to be formed, a recording head (not shown) for performing image formation on the sheet in a predetermined position on the feeding path, and a carriage motor (not shown) for reciprocating a carriage with the recording head mounted thereon in a main scanning direction (perpendicular to a sheet feeding direction). The image forming apparatus 100 is configured to carry out image formation on the sheet when the feed motor, the recording head, and the carriage motor are driven by driving signals issued from the main board 2.

The power supply circuit 1 is configured to convert a commercial alternating-current (AC) voltage (e.g., AC 100V) input via a power supply plug 5, into a direct-current (DC) main supply voltage and output the main supply voltage toward the main board 2. The power supply circuit 1 includes a power output terminal 6 (a positive terminal) configured to output therefrom the main supply voltage, an operation mode switching signal input terminal 7 configured such that an operation mode switching signal PSOFF is input thereinto, and a ground (GND) terminal 8 (a negative terminal) configured to be connected with a signal ground (SG).

As will be described below, the image forming apparatus 100 of the embodiment has two operation modes, i.e., a normal operation mode and a power-saving mode. In the image forming apparatus 100, the operation mode switching signal PSOFF depending on the operation mode is transmitted from the main board 2 to the power supply circuit 1. The operation mode switching signal PSOFF is a dichotomous signal taking one of a high level (hereinafter simply referred to as "Hi") and a low level (hereinafter simply referred to as "Low"). Specifically, the operation mode switching signal PSOFF takes "Low" in the normal operation mode and "Hi" in the power-saving mode.

When the operation mode switching signal PSOFF received from the main board 2 is "Low" (i.e., in the normal operation mode), the power supply circuit 1 generates and outputs a first voltage V1. Meanwhile, when the operation mode switching signal PSOFF received from the main board 2 is "Hi" (i.e., in the power-saving mode), the power supply circuit 1 generates and outputs a second voltage V2.

Figure 2:
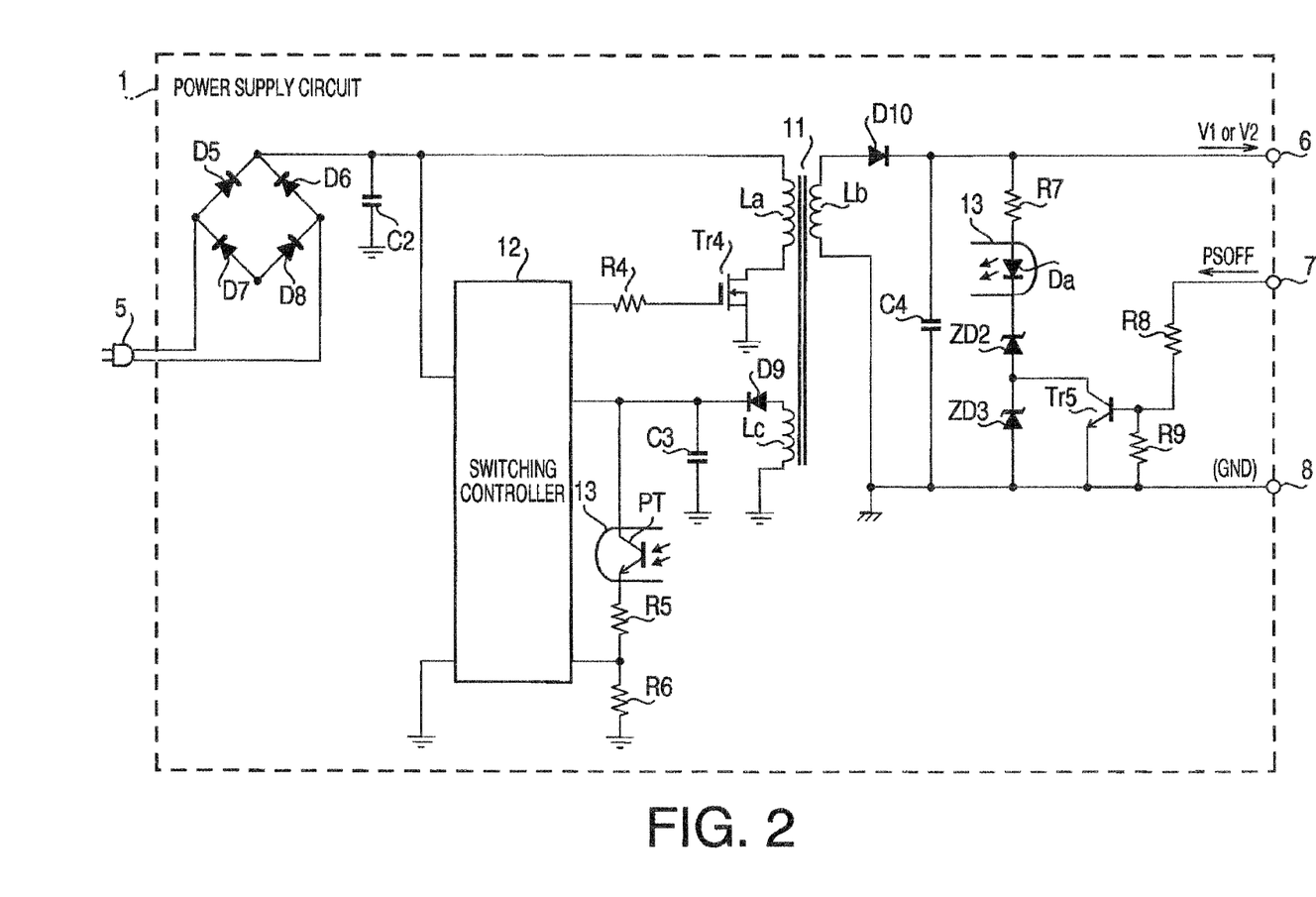
FIG. 2 is an electric diagram showing an internal electric configuration of a power supply circuit for the image forming apparatus in the embodiment according to one or more aspects of the present invention.

As illustrated in FIG. 2, the power supply circuit 1 is configured as a so-called insulating fly-back converter, in a known manner as a whole, except for a configuration for switching the output voltage depending on the operation mode switching signal PSOFF.

As shown in FIG. 2, the commercial AC voltage input via the power supply plug 5 is full-wave-rectified by a so-called diode bridge circuit formed with four diodes D5, D6, D7, and D8. Then, the rectified output (pulsating flow) is smoothed by an input smoothing condenser (capacitor) C2 and input into an end of a primary winding La of a transformer 11. The other end of the primary winding La is connected with a drain of a switching transistor Tr4.

The switching transistor Tr4 is configured as a switch for rendering intermissive an electric current carried through the primary winding La. The source of the switching transistor Tr4 is connected with a frame ground (FG). The gate of the switching transistor Tr4 is connected with a switching controller 12 via a resistor R4. Thus, the switching transistor Tr4 is turned on/off in response to a switching control signal that is input into the gate from the switching controller 12 via the resistor R4.

A secondary winding Lb of the transformer 11 has an end thereof connected with the anode of a secondary rectifier diode D10 and the other end thereof connected with the GND terminal 8 (i.e., the SG). The cathode of the secondary rectifier diode D10 is connected with the power output terminal 6 and an end of a secondary output smoothing condenser (capacitor) C4. The other end of the secondary output smoothing condenser C4 is connected with the SG. Therefore, after being rectified by the secondary rectifier diode D10 and further smoothed by the secondary output smoothing condenser C4, an output voltage from the secondary winding Lb is output from the power output terminal 6.

Further, an end (i.e., the power output terminal 6) of the secondary output smoothing condenser C4 is connected with a resistor R7. The other end of the resistor R7 is connected with the anode of a photodiode Da of a photo-coupler 13. The cathode of the photodiode Da is connected with the cathode of a second zener diode ZD2. The anode of the zener diode ZD2 is connected with the cathode of a third zener diode ZD3. The anode of the third zener diode ZD3 is connected with the GND terminal 8 (SG). Further, the connection point between the anode of the second zener diode ZD2 and the cathode of the third zener diode ZD3 is connected with the collector of a voltage switching transistor Tr5. In the voltage switching transistor Tr5, the emitter thereof is connected with the GND terminal 8, and the base thereof is connected with the operation mode switching signal input terminal 7 via a resistor R8. Further, there is a resistor R9 for bias provided between the base and the emitter of the voltage switching transistor Tr5.

According to the aforementioned configuration, when the operation mode switching signal PSOFF is "Low" (i.e., in the normal operation mode), the voltage switching transistor Tr5 is turned off. Therefore, in this case, the main supply voltage output from the power supply circuit 1 is determined to be the first voltage V1 (31 V) in the embodiment as described above, mainly in accordance with the sum of respective zener voltages (breakdown voltages) of the second zener diode ZD2 and the third zener diode ZD3.

Meanwhile, when the operation mode switching signal PSOFF is "Hi" (i.e., in the power-saving mode), the voltage switching transistor Tr5 is turned on, so as to short-circuit a section between the anode and the cathode of the third zener diode ZD3. Therefore, in this case, the main supply voltage is determined to be the second voltage V2 (5 V) in the embodiment, mainly in accordance with a zener voltage of the second zener diode ZD2.

Further, the main supply voltage output from the power supply circuit 1 is fed back to the switching controller 12 by the photo-coupler 13. Into the switching controller 12A, a voltage, which is generated by a tertiary winding Lc of the transformer 11, rectified by a tertiary rectifier diode D9, and smoothed by a tertiary output smoothing condenser (capacitor) C3, is input as a supply voltage for driving the switching controller 12A.

Further, to a section between the cathode of the tertiary rectifier diode D9 and the frame ground, a series circuit having a photo-coupler 13 (specifically, a phototransistor PT) and two voltage-dividing resistors R5 and R6 is connected. Namely, the cathode of the tertiary rectifier diode D9 is connected with the collector of the phototransistor PT. The emitter of the phototransistor PT is connected with an end of the first voltage-dividing resistor R5. The other end of the first voltage-dividing resistor R5 is connected with an end of the second voltage-dividing resistor R6 and the switching controller 12. The other end of the second voltage-dividing resistor R6 is connected with the FG.

According to the aforementioned configuration, the secondary output voltage (the main supply voltage) is, via the photo-coupler 13, input (fed back) to the switching controller 12 as a voltage at the connection point between the two voltage-dividing resistors R5 and R6. On the basis of the feedback signal and the output voltage from the diode bridge circuit, the switching controller 12 controls a switching operation of the switching transistor Tr4 such that a desired main supply voltage (V1 or V2) is generated and output.

Referring back to FIG. 1, an explanation will be provided about a configuration of the main board 2. The main board 2 includes a power input terminal 36 configured to accept input of the main supply voltage from the power supply circuit 1, an operation mode switching signal output terminal 37 configured to output the operation mode switching signal PSOFF, and a GND terminal 38 configured to be connected with the signal ground (SG). The main supply voltage, input via the power input terminal 36, is input into a first voltage operating portion 23 inside a first functional section 21, and into a first regulator 28, a switching circuit 30, and an auxiliary regulator 20 as well.

The first regulator 28 is a non-insulating switching regulator (a step-down DC-DC converter) in the embodiment. It is noted that since a detailed configuration of a switching regulator of this kind has been known, a detailed internal configuration of the first regulator 28 will not shown or described.

The first regulator 28 is configured to step down the main supply voltage supplied from the power supply circuit 1, to the second voltage V2 (5V). The minimum operation input voltage (the input threshold) for the first regulator 28 is 10 V. Namely, while monitoring an input voltage supplied from the power supply circuit 1, the first regulator 28 performs an operation to generate and output the second voltage V2 (the rated voltage: 5 V) when the input voltage is equal to or more than 10 V. Meanwhile, the first regulator 28 stops its operation (is shut down) when the input voltage is less than 10 V.

Then, the second voltage V2 generated by the first regulator 28 is input into the first functional section 21 (specifically, into a second voltage operating portion 24) as a supply voltage for the first functional section 21, and into a second functional section 22 and a second regulator 29 as well via a first diode D1.

The main board 2 includes the first functional section 21 and the second functional section 22 as loads operating with the first voltage V1 or the second voltage V2 as a supply voltage therefor. The first functional section 21 includes the first voltage operating portion 23 that operates with the first voltage V1 as a supply voltage therefor, and the second voltage operating portion 24 that operates with the second voltage V2 as a supply voltage therefor.

Into the first voltage operating portion 23, the main supply voltage supplied via the power input terminal 36 is input. Therefore, the first voltage operating portion 23 operates in the normal operation mode where the main supply voltage supplied from the power supply circuit 1 is the first voltage V1, and stops its operation in the power-saving mode where the main supply voltage is the second voltage V2. To the second voltage operating portion 24, the second voltage V2 is supplied from the first regulator 28. Since the first regulator 28 operates in the normal operation mode (where the input voltage is equal to or more than 10 V), the second voltage operating portion 24 as well operates in the normal operation mode where the main supply voltage is the first voltage V1. Further, the second voltage operating portion 24 stops its operation in the power-saving mode where the main supply voltage is the second voltage V2.

The first voltage operating portion 23 of the first functional section 21 contains a variety of driving circuits 41 for driving the aforementioned recording head and various motors. In addition, the second voltage operating portion 24 of the first functional section 21 contains a variety of controllers 43 for controlling various circuits including the driving circuits 41, and a CPU that takes overall control of the entire image forming apparatus 100.

The second functional section 22 operates mainly with the second voltage V2, and includes a functional circuit that operates with a third voltage generated by the second regulator 29. The second functional section 22 has the maximum rated input voltage (in the embodiment, 5.5 V) set therefor, and is ensured normally operating when the supply voltage input thereinto is equal to or less than the maximum rated input voltage. Additionally, the second functional section 22 includes an activating factor detecting portion 25 configured to detect existence of an activating factor for switching the operation mode from the power-saving mode to the normal operation mode, a real time clock (RTC), and an operation mode switching signal output portion 27.

Figure 3:
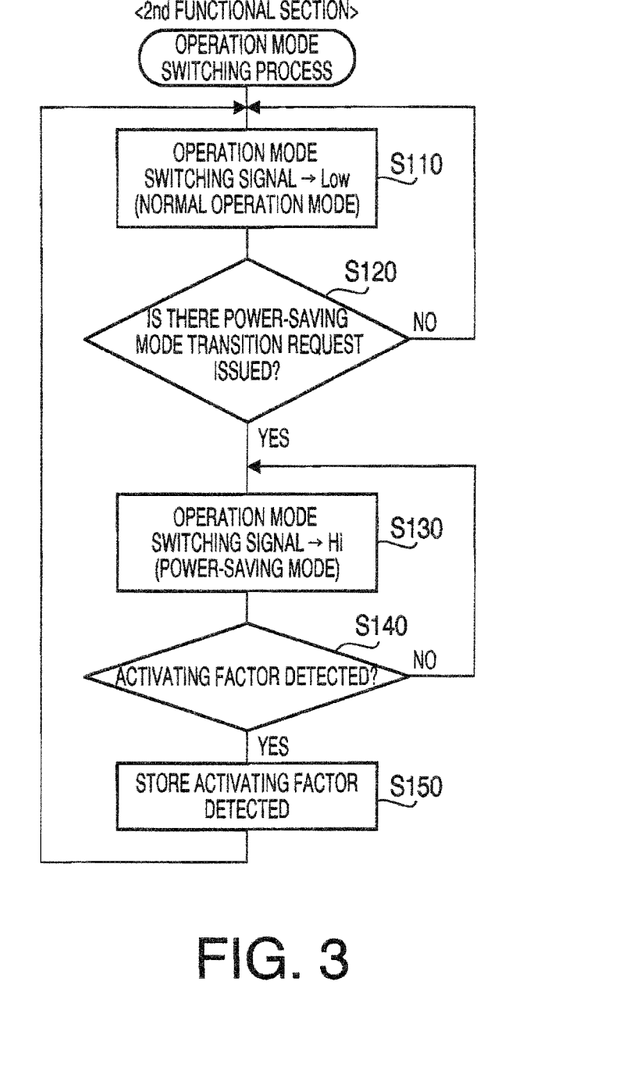
FIG. 3 is a flowchart showing a procedure of an operation mode switching process to be executed by a second functional section in the embodiment according to one or more aspects of the present invention.

An explanation will be provided about an operation mode switching process, which is one of main processes that the second functional section 22 performs, with reference to FIG. 3. It is noted that the operation mode switching process to be executed by the second functional section 22 is an operation based on not software but hardware (a logic circuit). In the following description, the hardware-based operation (i.e., the operation mode switching process) will be described using a flowchart for the sake of clarity.

When beginning to operate in response to the second voltage V2 being supplied thereto, the second functional section 22 initially sets the operation mode switching signal PSOFF to "Low" and sets the operation mode to the normal operation mode in S110. Then, in S120, the second functional section 22 determines whether there is a power-saving mode transition request issued. It is noted that the power-saving mode transition request is a request that the CPU 42 issues and inputs into the second functional section 22 in S240 of a below-mentioned operation mode switching process (see FIG. 4) to be executed by the CPU 42.

When the power-saving mode transition request is not input into the second functional section 22 (S120: No), the second functional section 22 goes back to S110. Meanwhile, when the power-saving mode transition request is input into the second functional section 22 (S120: Yes), the second functional section 22 sets the operation mode switching signal PSOFF to "Hi" and switches the operation mode to the power-saving mode in S130. Thereafter, in S140, the second functional section 22 determines whether the activating factor is detected by the activating factor detecting portion 25. It is noted that as the activating factor, various factors may be cited, such as a user operation of setting on the aforementioned switch and an operation of activating a timer function of the RTC 26.

After transition to the power-saving mode, while the activating factor is not being detected (S140: No), the second functional section 22 repeatedly goes back to S130. Meanwhile, when the activating factor is detected (S140: Yes), the second functional section 22 stores the detected activating factor in S150. Then, the second functional section 22 again goes back to S110, in which the second functional section 22 sets the operation mode switching signal PSOFF to "Low" and switches the operation mode to the normal operation mode. Thereafter, the second functional section 22 goes to S120 and the following steps.

Subsequently, an explanation will be provided about an operation mode switching process to be executed by the CPU 42, with reference to FIG. 4. The CPU 42 operates with the second voltage V2 supplied from the first regulator 28 (i.e., in the normal operation mode), and executes various control processes, such as the operation mode switching process shown in FIG. 4, in accordance with various control programs stored on a memory (not shown).

Figure 4:
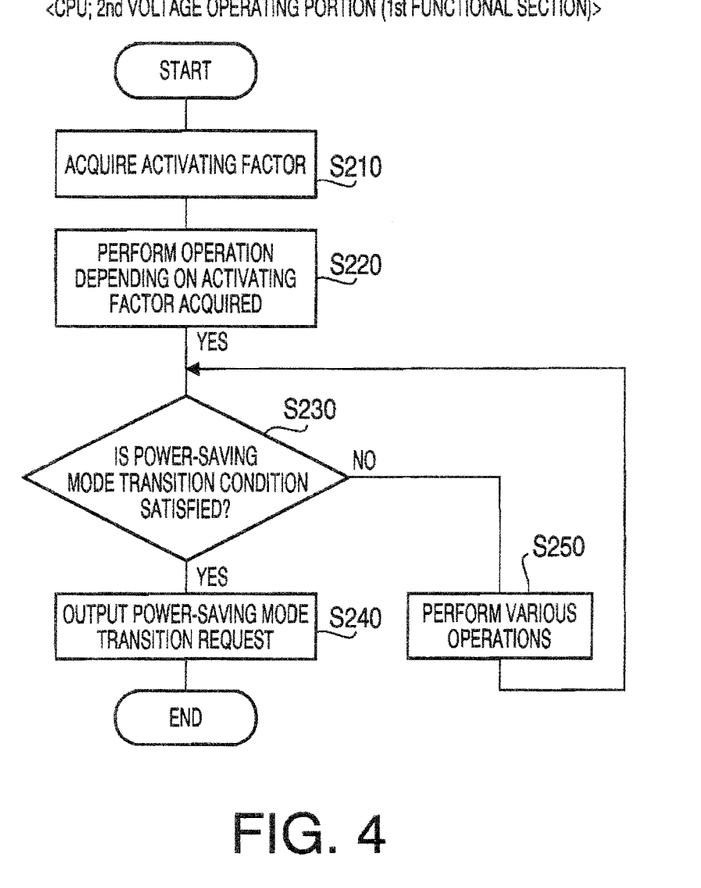
FIG. 4 is a flowchart showing a procedure of an operation mode switching process to be executed by a CPU in a second voltage operating portion in the embodiment according to one or more aspects of the present invention.

When beginning to operate in response to the second voltage V2 being supplied to the first functional section 21, the CPU 42 starts the operation mode switching process shown in FIG. 4, in which the CPU 42 initially acquires the activating factor stored in the second functional section 22 (the activating factor stored in S150 shown in FIG. 3) in S210. Then, the CPU 42 performs an operation depending on the acquired activating factor in S220.

In S230, the CPU 42 determines whether a power-saving mode transition condition is satisfied. It is noted that as the power-saving mode transition condition, various conditions may be cited, such as a situation where the image forming apparatus 100 has externally received no continuous input of image data for a predetermined time period and a state where a flag has been set to show that the operation mode is to be changed into the power-saving mode by a software process.

When determining that the power-saving mode transition condition is not satisfied (S230: No), the CPU 42 goes to S250, in which the CPU 42 performs predetermined various operations. After that, the CPU 42 again goes back to S230. Meanwhile, when determining that the power-saving mode transition condition is satisfied (S230: Yes), the CPU 42 issues the power-saving mode transition request to the second functional section 22 in S240. Thereafter, the CPU 42 terminates the operation mode switching process.

Referring back to FIG. 1, a further explanation will be provided about the main board 2. The second functional section 22 and the second regulator 29, which are loads to always operate regardless of whether the operation mode is, have to be always supplied with the second voltage V2 regardless of the operation mode. In the embodiment, in the normal operation mode, the second functional section 22 and the second regulator 29 operate with the second voltage V2 supplied from the first regulator 28 via the first diode D1. However, in the power-saving mode where the input voltage into the first regulator 28 is less than 10 V, the first regulator 28 stops generating the second voltage V2.

In the embodiment, even in the power-saving mode, the second functional section 22 and the second regulator 29 are supplied with the second voltage V2. Specifically, the main supply voltage input into the power input terminal 36 is supplied to the second functional section 22 and the second regulator 29 via the switching circuit 30 and the second diode D2 without involving the first regulator 28.

It is noted that the supply voltage input into the second functional section 22 and the second regulator 29 is to be always supplied thereto regardless of the operation mode, as described above. Hence, hereinafter, the supply voltage to be supplied to the second functional section 22 and the second regulator 29 will be referred to as an "always-supplied voltage to be input the second functional section 22" or simply as an "always-supplied voltage."

The switching circuit 30 is configured to make or break a power supply path extending from the power input terminal 36 to the second functional section 22 and the second regulator 29 via the second diode D2. Further, the switching circuit 30 includes a first transistor Tr1 inserted on the power supply path so as to make or break the power supply path. The first transistor Tr1 is provided with the emitter thereof connected to the power input terminal 36, the collector thereof connected to the anode of the second diode D2, and the base thereof connected to the collector of a second transistor Tr2 via the resistor R3. The emitter of the second transistor Tr2 is connected with the SG, and the base thereof is connected with the collector of a third transistor Tr3. In addition, the switching circuit 30 includes a resistor R1 with an end thereof connected to the power input terminal 36, and a first zener diode ZD1 with the cathode thereof connected to the other end of the resistor R1 and the anode thereof connected to the base of the third transistor Tr3. The third transistor Tr3 is provided with the emitter thereof connected to the SG, and the collector thereof connected to the base of the second transistor Tr2 and an end of the resistor R2. The other end of the resistor R2 is connected with the power input terminal 36.

The switching circuit 30 is provided to supply the main supply voltage (the second voltage V2) from the power supply circuit 1 to the second functional section 22 in the power-saving mode. Therefore, the switching circuit 30 is generally turned on in the power-saving mode. More specifically, the switching circuit 30 is turned on when the main supply voltage input thereinto is lower than 5.5 V (the maximum rated input voltage for the second functional section 22). In other words, when the main supply voltage input thereinto is lower than 5.5 V, a requirement for making the power supply path is satisfied, and the switching circuit 30 is turned on. Further, when the main supply voltage input thereinto is equal to or higher than 5.5 V, a requirement for breaking the power supply path is satisfied, and the switching circuit 30 is turned off.

Specifically, the first zener diode ZD1 employed for the switching circuit 30 is configured to carry an opposite-direction current and turned on the third transistor Tr3 when the main supply voltage is equal to or more than 5.5 V. When the third transistor Tr3 is turned on, the first transistor Tr1 is turned off, and the switching circuit 30 is turned off as a whole. Namely, the switching circuit 30 is configured to be turned on in the power-saving mode and to be turned off when the operation mode is switched to the normal operation mode where the main supply voltage is equal to or more than 5.5 V.

In the meantime, in the embodiment, the second functional section 22 is supplied with the second voltage V2 from the first regulator 28 in the normal operation mode and with the second voltage V2 from the power supply circuit 1 via the switching circuit 30 in the power-saving mode. Therefore, the second functional section 22 (and the second regulator 29) is (are) configured as a whole to be always supplied with the supply voltage. Strictly, however, a no-power-supplied period, during which the second functional section 22 is not supplied with the second voltage V2 via any of the first regulator 28 and the switching circuit 30, arises at a time when the operation mode is changed.

In the embodiment, a chargeable condenser (capacitor) C1 is connected to between the SG and each cathode of the first diode D1 and the second diode D2. Thus, even in the aforementioned no-power-supplied period, it is possible to continuously operate the second functional section 22 with an electric power generated by the chargeable condenser C1. However, in this case, the chargeable condenser C1 is required to have a large electrostatic capacitance enough to certainly maintain a continuous operation of the second functional section 22 in the no-power-supplied period. Such a solution as to purvey all the electric power necessary for maintaining the continuous operation of the second functional section 22 in the no-power-supplied period only with the chargeable condenser C1 is unrealistic.

In consideration of the above problem, the main board 2 of the embodiment includes the auxiliary regulator 20 for supplying the supply voltage to the second functional section 22 in the no-power-supplied period. The auxiliary regulator 20 employed in the embodiment is a known linear (series) regulator configured to perform an operation to generate and output the second voltage V2 (5 V) when an auxiliary regulator control signal issued by an AND gate 34 is "Hi." Then, the second voltage V2 output from the auxiliary regulator 20 is supplied to the second functional section 22 via a third diode D3.

A linear regulator generally has a disadvantage that an efficiency (conversion efficiency) thereof is lower than that of a switching regulator. However, the auxiliary regulator 20 supplies the second voltage V2 supplementarily during only a short time period for switching the operation mode. Therefore, a low efficiency of the auxiliary regulator 20 has little influence. Thus, the linear regulator is employed for the auxiliary regulator 20 with the emphasis on the cost and the working speed (the booting speed) rather than the efficiency.

It is noted that the linear regulator is configured in a known manner. Further, a configuration for switching the linear regulator between active and inactive states in accordance with an external input signal is also known (e.g., a linear regulator IC with an enable terminal). Therefore, detailed illustration or explanation of an internal configuration of the auxiliary regulator 20 will be omitted.

In the embodiment, when the following three conditions a to c are satisfied, the auxiliary regular control signal issued by the AND gate 34 is "Hi" and the auxiliary regulator 20 begins to operate (to generate and output the second voltage V2).

Condition a: the first regulator 28 is not generating the second voltage V2.

Condition b: the switching circuit 30 is turned off.

Condition c: the second functional section 22 (and the second regulator 29) is (are) operating.

In order to determine whether the condition a, of the above three conditions a to c, is satisfied, a first comparator 31 is provided. The first comparator 31 receives, via a noninversion input terminal thereof, the output voltage from the first regulator 28. Further, the first comparator 31 receives a predetermined first reference voltage Vr1 via an inversion terminal thereof. A comparison result between the output voltage from the first regulator 28 and the first reference voltage Vr1 is inverted and input into the AND gate 34.

The embodiment provides an example in which the first reference voltage Vr1 is 4 V. Hence, when the output voltage from the first regulator 28 is equal to or more than 4 V, the output voltage from the first comparator 31 is "Low." The "Low" output voltage represents that the condition a is not satisfied (i.e., the first regulator 28 is generating the second voltage V2). Meanwhile, when the output voltage from the first regulator 28 is less than 4 V, the output voltage from the first comparator 31 is "Hi." The "Hi" output voltage represents that the condition a is satisfied.

Further, in order to determine whether the condition b is satisfied, an inverter (an inhibit gate) 33 is provided. Into the inverter 33, the collector voltage of the third transistor Tr3 (included in the switching circuit 30) is input. When the switching circuit 30 is turned on, the output voltage from the inverter 33 is "Low," and the "Low" output voltage is input into the AND gate 34. Meanwhile, when the switching circuit 30 is turned off, the output voltage from the inverter 33 is "Hi," and the "Hi" output voltage is input into the AND gate 34.

Further, in order to determine whether the condition c is satisfied, a second comparator 32 is provided. The second comparator 32 receives, via a noninversion input terminal thereof, the always-supplied voltage (i.e., the voltage at each cathode of the first to third diodes D1, D2, and D3) that is input into the second functional section 22 and the second regulator 29. Further, the second comparator 32 receives a predetermined second reference voltage Vr2 via an inversion input terminal thereof. A comparison result between the always-supplied voltage and the second reference voltage Vr2 is input into the AND gate 34.

In the embodiment, the second reference voltage Vr2 is 4 V. Therefore, when the always-supplied voltage is less than 4 V, the output voltage from the second comparator 32 is "Low," and it represents that the condition c is not satisfied. Meanwhile, when the always-supplied voltage is equal to or more than 4 V, the output voltage from the second comparator 32 is "Hi," and it represents that the condition c is satisfied.

The auxiliary regulator control signal issued by the AND gate 34 is "Hi" when the conditions a to c are all satisfied. When the conditions a to c are not all satisfied, the auxiliary regulator control signal issued by the AND gate 34 is "Low."

Subsequently, an explanation will be provided about an operation of the image forming apparatus 100 of the embodiment, especially about operations of the first regulator 28, the switching circuit 30, and the auxiliary regulator 20 in response to the operation mode being switched, with reference to FIG. 5.

Figure 5:
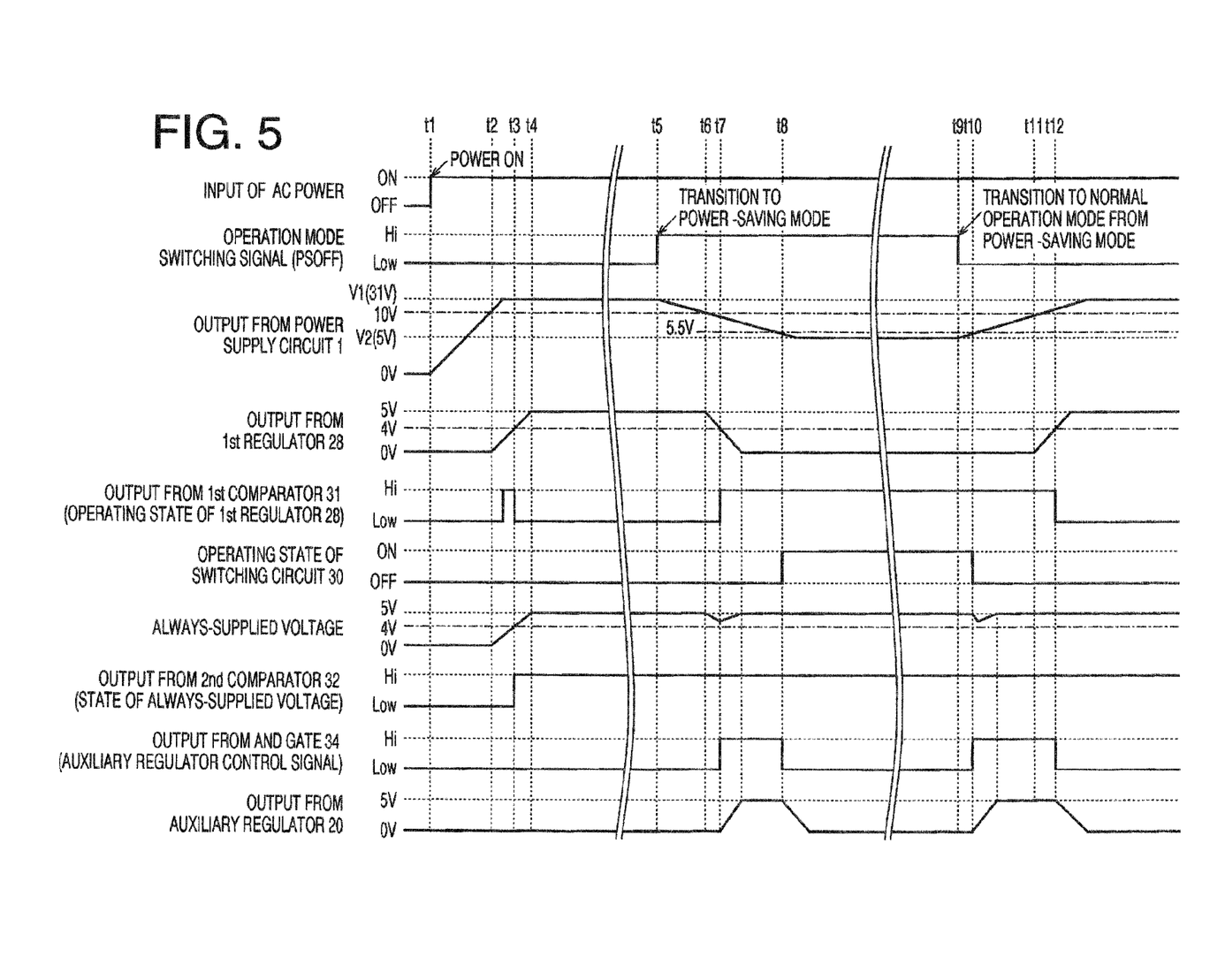
FIG. 5 is a time chart exemplifying electric operations performed in the image forming apparatus in the embodiment according to one or more aspects of the present invention.

As illustrated in FIG. 5, when the AC voltage is supplied via the power supply plug 5 (time: t1), the power supply circuit 1 begins to operate, and the main supply voltage from the power supply circuit 1 rises. The operation mode switching signal PSOFF is "Low" at initial start-up, the main supply voltage rises toward the first voltage V1 (31 V). Then, in the middle of the process that the main supply voltage is rising, when the main supply voltage reaches 10 V (time: t2), the first regulator 28 begins to operate, and the output voltage from the first regulator 28 starts rising toward the second voltage V2 (5V). Thereby, the always-supplied voltage to be input into the second functional section 22 also starts rising.

Then, when the output voltage from the first regulator 28 reaches 4 V (time: t3), the output voltage from the second comparator 32 is "Hi." It denotes that the second functional section 22 is in a state to be able to operate (consequently, it denotes that the condition c is satisfied).

Thereafter, the main supply voltage from the power supply circuit 1 and the output voltage from the first regulator 28 keep rising, and at a time t4, the output voltage from the first regulator 28 becomes the rated second voltage V2 (5 V). At the same time, the always-supplied voltage to be input into the second functional section 22 becomes the second voltage V2 (5 V).

Thereafter, at a time t5, when the operation mode switching signal PSOFF becomes "Hi" in response to the power-saving mode condition being satisfied, the main supply voltage from the power supply circuit 1 descends from the first voltage V1 to the second voltage V2. Then, at a time t6, when the main supply voltage becomes lower than 10 V, the first regulator 28 is shut down to stop its operation, and the output voltage from the first regulator 28 descends. In response to it, the always-supplied voltage to be input into the second functional section 22 descends as well.

Then, when the output voltage from the first regulator 28 becomes lower than 4V (time: t7), the output voltage from the first comparator 31 becomes "Hi." It denotes that the condition a is satisfied. Additionally, at this time, as the main supply voltage is still equal to or higher than 5.5 V, the switching circuit 30 still remains turned off. Thus, the condition b is satisfied as well. Therefore, at the time t7, the conditions a to c are all satisfied, and thereby the output voltage from the AND gate 34 is "Hi." Hence, the auxiliary regulator 20 begins to operate, and the output voltage from the auxiliary regulator 20 rises toward the second voltage V2. Then, when the second functional section 22 is supplied with the output voltage from the auxiliary regulator 20 via the third diode D3, the always-supplied voltage input into the second functional section 22 again rises to the second voltage V2.

During this time period, the main supply voltage from the power supply circuit 1 descends toward the second voltage V2 and eventually becomes lower than 5.5 V (time: t8). Thereby, the switching circuit 30 is turned on, and it leads to a state where the condition b is not satisfied. Therefore, the output voltage from the AND gate 34 becomes "Low," the auxiliary regulator 20 stops its operation. Nevertheless, as the switching circuit 30 is turned on, the main supply voltage from the power supply circuit 1 is supplied to the second functional section 22 via the switching circuit 30 and the second diode D2. Thus, the always-supplied voltage is maintained to be the second voltage V2 (or a voltage close to the second voltage V2) such that the second functional section 22 can keep operating.

After that, at a time t9, when the operation mode switching signal PSOFF becomes "Low" in response to a condition for transition to the normal operation mode being satisfied (i.e., in response to the activating factor being detected), the main supply voltage from the power supply circuit 1 rises toward the first voltage V1 from the second voltage V2. Then, when the main supply voltage becomes equal to or higher than 5.5 V at a time t10, the switching circuit 30 is turned off such that the supply of the second voltage V2 via the switching circuit 30 is shut down.

However, the condition b is satisfied in response to the switching circuit 30 being turned off. Further, at this time, the conditions a and c are satisfied as well. Therefore, the output voltage from the AND gate 34 becomes "Hi," and the auxiliary regulator 20 begins to operate and supply the second voltage V2.

After that, when the main supply voltage from the power supply circuit 1 becomes equal to or more than 10 V at a time t11, the first regulator 28 begins to operate. Then, when the output voltage from the first regulator 28 becomes equal to or more than 4 V, the output voltage from the first comparator 31 becomes "Low." It denotes that the condition a is not satisfied. Therefore, the output voltage from the AND gate 34 becomes "Low," the auxiliary regulator 20 stops its operation. Thus, the auxiliary regulator 20 stops its operation. However, since the output voltage from the first regulator 28 becomes equal to or more than 4 V and eventually reaches the rated second voltage V2, the always-supplied voltage is maintained to be the second voltage V2 (or a voltage close to the second voltage V2) such that the second functional section 22 can keep operating.

As described above, the image forming apparatus 100 of the embodiment includes the auxiliary regulator 20, which supplies the supply voltage during the no-power-supplied period in which the supply voltage (the second voltage V2) is not supplied to the second functional section 22 from any of the first regulator 28 and the switching circuit 30.

Therefore, it is possible to avoid an undesired situation where the supply voltage is not supplied to the second functional section 22, which is required to always operate regardless of the operation mode, in the process of switching the operation mode. Thus, it is possible to maintain a continuous stable operation of the second functional section 22 even in the process of switching the operation mode.

Further, in the power-saving mode, the power supply circuit 1 directly generates and outputs the second voltage V2. Thereby, in the power-saving mode, as the first regulator 28 is not required to operate, it is possible to reduce electric power consumption of the first regulator 28.

Further, in the embodiment, it is determined whether to operate the auxiliary regulator 20, based on the three conditions a to c. The determination as to whether the three conditions a to c are satisfied is made based on the output voltages from the first comparator 31, the second comparator 32, and the inverter 33, respectively. Then, the determination result is finally output as the auxiliary regulator control signal from the AND gate 34. Hence, the simple circuit configuration makes it possible to determine whether the three conditions a to c are satisfied. Thus, it is possible to operate the auxiliary regulator 20 certainly as needed.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

MODIFICATIONS

The configuration of the switching circuit 30 is not limited to that exemplified in FIG. 1, as long as the main supply voltage from the power supply circuit 1 can be supplied to the second functional section 22 directly (i.e., without passing through the first regulator 28) via the second diode D2. In the aforementioned embodiment, the switching circuit 30 is configured to be turned on/off depending on the main supply voltage supplied from the power supply circuit 1. However, the switching circuit 30 may be further configured to receive the operation mode switching signal PSOFF from the second functional section 22 and to be turned on when the operation mode switching signal PSOFF is "Hi" (i.e., in the power-saving mode).

The reference voltages Vr1 and Vr2 are not limited to 4 V exemplified in the aforementioned embodiment. The minimum operation input voltage (the input threshold) for the first regulator 28 is not limited to 10 V exemplified in the aforementioned embodiment. The minimum input voltage for making the first zener diode ZD1 carry the opposite-direction current and turning on the switching circuit 30 is not limited to 5.5 V exemplified in the aforementioned embodiment.

In the aforementioned embodiment, the determination as to whether the first regulator 28 normally operates is made based on the output voltage from the first regulator 28. However, the determination may be made based on whether or not the voltage input into the first regulator 28 is equal to or more than the minimum operation input voltage (10 V) for the first regulator 28. Alternatively, the determination may be made based on an operating state in the first regulator 28.

In the aforementioned embodiment, the determination as to whether the switching circuit 30 is turned on or off is made based on the collector voltage of the third transistor Tr3 included in the switching circuit 30. However, the determination may be made based on whether or not the main supply voltage is equal to or more than 5.5 V. Alternatively, the determination may be made based on the output voltage from the switching circuit 30 (i.e., the collector voltage of the first transistor Tr1).

In the aforementioned embodiment, the signal indicating the on/off state of the switching circuit 30 is input into the AND gate 34 via the inverter 33. In addition, the determination as to whether the second voltage V2 is output from (generated by) the first regulator 28 (specifically, whether a voltage equal to or more than 4 V is output) is made using the first comparator 31, and the signal indicating the result of the determination is input into the AND gate 34. Further, the determination as to whether the second functional section 22 is operating is made with the second comparator 32, and the signal indicating the result of the determination is input into the AND gate 34. Moreover, the operation of the auxiliary regulator 20 is controlled based on the auxiliary regulator control signal issued by the AND gate 34. However, it is noted that the above operations (configurations) are just examples, and various configurations may be feasible as far as the auxiliary regulator 20 is operated to output the second voltage V2 at an appropriate moment during an appropriate period.

Further, it is noted that the condition c, of the three conditions a to c, is not an indispensable condition, and that the auxiliary regulator 20 may be operated when both the conditions a and b are satisfied. However, when the auxiliary regulator 20 is operated with only the conditions a and b being satisfied, the following undesired situation is caused. When the power supply circuit 1 is in the middle of a start-up operation and supplies an insufficient output voltage at a cold start immediately after the AC voltage is supplied to the power supply circuit 1, the auxiliary regulator 20 operates, and further the second regulator 29 also operates as a (constant power) load for the auxiliary regulator 20. Thus, a large current is carried through the auxiliary regulator 20 and the downstream loads. In such a case, when the power supply circuit 1 does not have a capability to supply an adequate current, the power supply circuit 1 has an undesired influence on the operation thereof.

Therefore, especially in a case such as the aforementioned embodiment where a constant power load such as the second regulator 29 is contained in loads supplied with the supply voltage from the auxiliary regulator 20, it is desired to forbid the operation of the auxiliary regulator 20 at the cold start (i.e., to add the condition c). Thus, it is possible to prevent the auxiliary regulator 20 from operating at the cold start when the second functional section 22 does not yet operate.

In the aforementioned embodiment, the first regulator 28 is exemplified as a switching regulator. Further, the auxiliary regulator 20 is exemplified to as a linear regulator. However, the first regulator 28 may be configured as a regulator of a different type from a switching regulator. Additionally, the auxiliary regulator 20 may be configured as a regulator of a different type from a linear regulator.

What is claimed is:

1. A power supply device configured to operate in one of a normal operation mode and a power-saving mode, comprising:
   a first load configured to operate with a first voltage supplied thereto in the normal operation mode;
   a second load configured to operate with a second voltage supplied thereto in the normal operation mode, the second voltage being lower than the first voltage;
   a third load configured to operate with the second voltage supplied thereto in both the normal operation mode and the power-saving mode;

a main power supply circuit configured to output, as a main supply voltage, at least one of the first voltage and the second voltage in response to an operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode;

a first-load electric path configured to carry therethrough the main supply voltage from the main power supply circuit to the first load;

a primary second-voltage generating circuit configured to, when the main supply voltage is supplied thereto from the main power supply circuit and the main supply voltage is lower than the first voltage and equal to or higher than a predetermined threshold value that is lower than the first voltage and higher than the second voltage, generate the second voltage from the main supply voltage and supply the generated second voltage to the second load and the third load;

a third-load electric path configured to carry therethrough the main supply voltage from the main power supply circuit to the third load without passing through the primary second-voltage generating circuit;

a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied; and an auxiliary second-voltage generating circuit configured to, when the main supply voltage is supplied from the main power supply circuit and the primary second-voltage generating circuit does not generate the second voltage with the third-load electric path being broken by the switching circuit, generate the second voltage from the main supply voltage and supply the generated second voltage to the third load.

2. The power supply device according to claim 1, further comprising:

a first determining unit configured to determine whether a first condition where the primary second-voltage generating circuit is not generating the second voltage is satisfied; and a second determining unit configured to determine whether a second condition where the switching circuit is breaking the third-load electric path is satisfied, wherein the auxiliary second-voltage generating circuit generates the second voltage when the first determining unit determines that the first condition is satisfied and the second determining unit determines that the second condition is satisfied.

3. The power supply device according to claim 2, wherein when the primary second-voltage generating circuit outputs a voltage lower than a predetermined threshold value lower than the second voltage, the first determining unit determines that the first condition is satisfied.

4. The power supply device according to claim 2, wherein the switching circuit comprises:

a semiconductor switching device configured to make and break the third-load electric path; and a switch controller configured to turn on the semiconductor switching device when the path-making condition is satisfied, and to turn off the semiconductor switching device when the path-breaking condition is satisfied, and wherein when the switch controller turns on the semiconductor switching device, the second determining determines that the second condition is satisfied.

5. The power supply device according to claim 1, further comprising a third-load-state determining unit configured to determine whether the third load is operating, wherein when the third-load-state determining unit determines that the third load is operating, the auxiliary second-voltage generating circuit generates the second voltage.

6. The power supply device according to claim 5, wherein when a voltage supplied to the third load is equal to or higher than a predetermined threshold value, the third-load determining unit determines that the third load is operating.

7. The power supply device according to claim 1, further comprising a capacitor connected to an electric path through which the second voltage is supplied to the third load from the primary second-voltage generating circuit and the switching circuit, the capacitor being configured to store electric charge when a voltage is supplied to the third load, and to discharge and supply the stored electric charge to the third load.

8. The power supply device according to claim 1, wherein the primary second-voltage generating circuit is configured as a switching regulator.

9. The power supply device according to claim 1, wherein the auxiliary second-voltage generating circuit is configured as a linear regulator.

10. A power supply device configured to operate in any of:

a normal operation mode in which the power supply device supplies a first load with a first voltage to operate the first load, and supplies each of a second load and a third load with a second voltage lower than the first voltage to operate the second load and the third load; and a power-saving mode in which the power supply device supplies the third load with the second voltage to operate the third load, the power supply device comprising:

a main power supply circuit configured to output, as a main supply voltage, at least one of the first voltage and the second voltage in response to an operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode;

a first-load electric path configured to carry therethrough the main supply voltage from the main power supply circuit to the first load;

a primary second-voltage generating circuit configured to, when the main supply voltage is supplied thereto from the main power supply circuit and the main supply voltage is lower than the first voltage and equal to or higher than a predetermined threshold value that is lower than the first voltage and higher than the second voltage, generate the second voltage from the main supply voltage and supply the generated second voltage to the second load and the third load;

a third-load electric path configured to carry therethrough the main supply voltage from the main power supply circuit to the third load without passing through the primary second-voltage generating circuit;

a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied; and an auxiliary second-voltage generating circuit configured to, when the main supply voltage is supplied from the main power supply circuit and the primary second-voltage generating circuit does not generate the second voltage with the third-load electric path being broken by the switching circuit, generate the second voltage from the main supply voltage and supply the generated second voltage to the third load.

11. An image forming apparatus comprising a power supply device configured to operate in one of a normal operation mode and a power-saving mode, the power supply device comprising:

a first load configured to operate with a first voltage supplied thereto in the normal operation mode, the first load comprising a driving unit configured to drive an image forming unit for perform image formation on a recording medium;

a second load configured to operate with a second voltage supplied thereto in the normal operation mode, the second voltage being lower than the first voltage, the second load comprising a controller configured to control the driving unit;

a third load configured to operate with the second voltage supplied thereto in both the normal operation mode and the power-saving mode, the third load comprising a switching signal output unit configured to output, as an operation mode switching signal, a signal indicating the power-saving mode when a predetermined power-saving mode transition condition is satisfied and to output, as the operation mode switching signal, a signal indicating the normal operation mode when a predetermined normal operation mode transition condition is satisfied;

a main power supply circuit configured to output, as a main supply voltage, at least one of the first voltage and the second voltage in response to the operation mode switching signal input thereinto, the main power supply circuit switching the main supply voltage to the first voltage when the operation mode switching signal is a signal indicating the normal operation mode, the main power supply circuit switching the main supply voltage to the second voltage when the operation mode switching signal is a signal indicating the power-saving mode;

a first-load electric path configured to carry therethrough the main supply voltage from the main power supply circuit to the first load;

a primary second-voltage generating circuit configured to, when the main supply voltage is supplied thereto from the main power supply circuit and the main supply voltage is lower than the first voltage and equal to or higher than a predetermined threshold value that is lower than the first voltage and higher than the second voltage, generate the second voltage from the main supply voltage and supply the generated second voltage to the second load and the third load;

a third-load electric path configured to carry therethrough the main supply voltage from the main power supply circuit to the third load without passing through the primary second-voltage generating circuit;

a switch circuit configured to make the third-load electric path when the operation mode switching signal is changed to the signal indicating the power-saving mode and a predetermined path-making condition is satisfied, and to break the third-load electric path when the operation mode switching signal is changed to the signal indicating the normal operation mode and a predetermined path-breaking condition is satisfied; and an auxiliary second-voltage generating circuit configured to, when the main supply voltage is supplied from the main power supply circuit and the primary second-voltage generating circuit does not generate the second voltage with the third-load electric path being broken by the switching circuit, generate the second voltage from the main supply voltage and supply the generated second voltage to the third load.

12. The image forming apparatus according to claim 11, wherein the power supply device further comprises:

a first determining unit configured to determine whether a first condition where the primary second-voltage generating circuit is not generating the second voltage is satisfied; and a second determining unit configured to determine whether a second condition where the switching circuit is breaking the third-load electric path is satisfied, and wherein the auxiliary second-voltage generating circuit generates the second voltage when the first determining unit determines that the first condition is satisfied and the second determining unit determines that the second condition is satisfied.

13. The image forming apparatus according to claim 12, wherein when the primary second-voltage generating circuit outputs a voltage lower than a predetermined threshold value lower than the second voltage, the first determining unit determines that the first condition is satisfied.

14. The image forming apparatus according to claim 12, wherein the switching circuit comprises:

a semiconductor switching device configured to make and break the third-load electric path; and a switch controller configured to turn on the semiconductor switching device when the path-making condition is satisfied, and to turn off the semiconductor switching device when the path-breaking condition is satisfied, and wherein when the switch controller turns on the semiconductor switching device, the second determining determines that the second condition is satisfied.

15. The image forming apparatus according to claim 11, wherein the power supply device further comprises a third-load-state determining unit configured to determine whether the third load is operating, and wherein when the third-load-state determining unit determines that the third load is operating, the auxiliary second-voltage generating circuit generates the second voltage.

16. The image forming apparatus according to claim 15, wherein when a voltage supplied to the third load is equal to or higher than a predetermined threshold value, the third-load determining unit determines that the third load is operating.

17. The image forming apparatus according to claim 11, wherein the power supply device further comprises a capacitor connected to an electric path through which the second voltage is supplied to the third load from the primary second-voltage generating circuit and the switching circuit, the capacitor being configured to store electric charge when a voltage is supplied to the third load, and to discharge and supply the stored electric charge to the third load.

18. The image forming apparatus according to claim 11, wherein the primary second-voltage generating circuit is configured as a switching regulator.

19. The image forming apparatus according to claim 11, wherein the auxiliary second-voltage generating circuit is configured as a linear regulator.

* * * * *